Figures 1, 2:
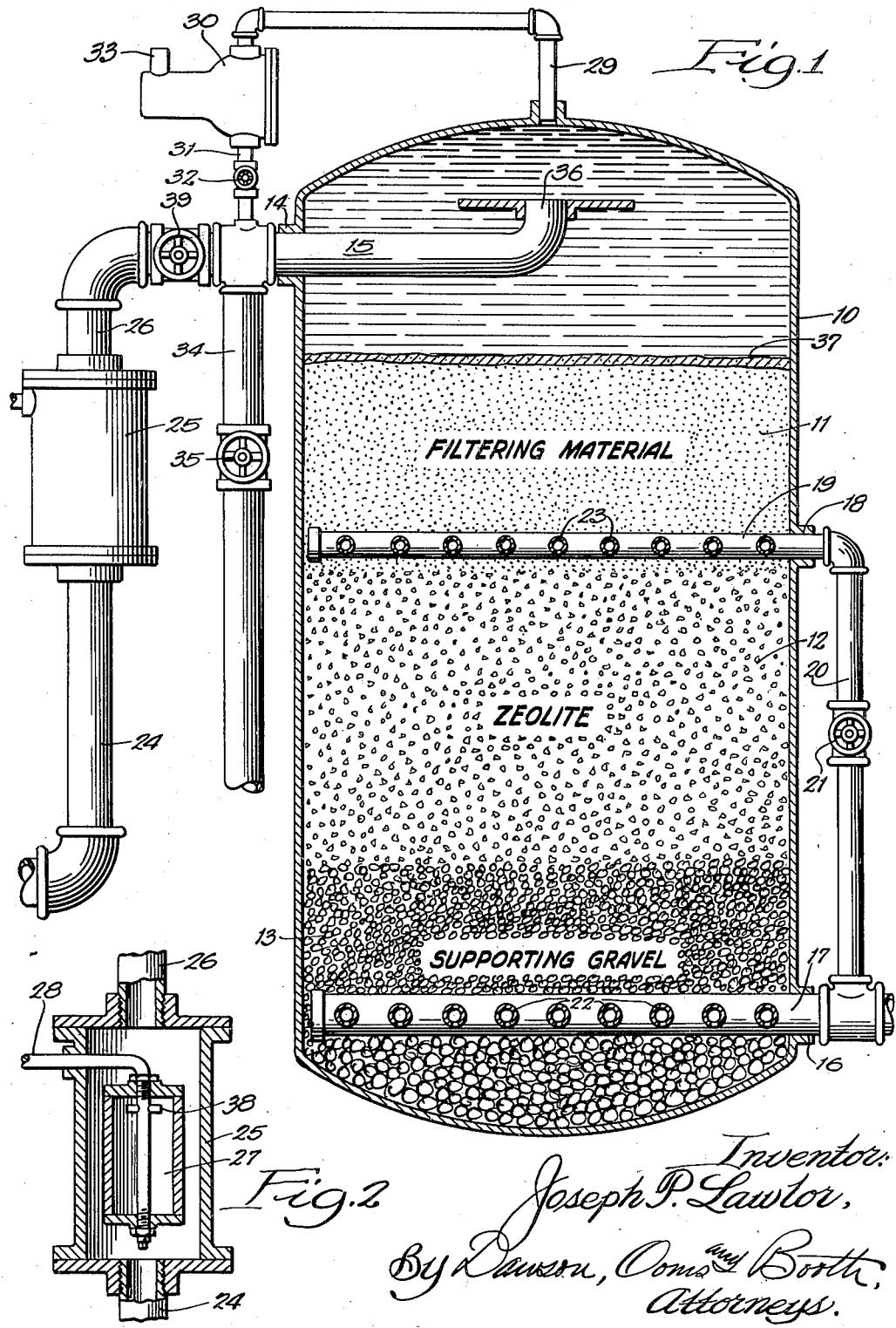

May 22, 1945.   J. P. LAWLOR   2,376,543

METHOD AND APPARATUS FOR TREATING WATER

Filed Sept. 22, 1941

Inventor:
Joseph P. Lawlor,
By Dawson, Ooms and Booth,
Attorneys.

Patented May 22, 1945

2,376,543

UNITED STATES PATENT OFFICE 2,376,543

METHOD AND APPARATUS FOR TREATING WATER

Joseph P. Lawlor, Ames, Iowa

Application September 22, 1941, Serial No. 411,797

6 Claims. (Cl. 210—24)

This invention relates to a method and apparatus for treating water and more particularly to treatment in a single unit to provide filtered softened water.

An object of the invention is to provide for water treatment in a single unit to obtain filtered water which is partially softened and to control the softening of the water in the process. Another object is to provide in the treatment of water for the filtering of the water to remove suspended matter therefrom, and, if desired, in the same unit to provide a softening of the water by the base exchange method. Still another object is to treat the water by filtration to remove suspended material therefrom and in the same unit and operation to soften a portion of the water, another portion of the water being by-passed above the softening agent and thereafter mixed with the softened water to obtain the desired degree of softening in the water.

Another object of the invention is to provide apparatus for water treatment in which a layer of filtering material and a layer of water softening material are disposed adjacent each other in the treating zone with the filtering material being of a lesser density than the water softening material and being supported on the layer of water softening material. A further object is to provide a single container or tank having a layer of filtering material supported therein on a layer of water softening material and to equip the tank with draw-off means whereby a portion of the water which is being treated may be by-passed about the layer of water softening material. Yet another object is to provide for the treatment of water to convert the soluble iron salts therein into insoluble suspended material and to thereafter remove from the water the suspended material and to partially soften the water, the filtering and water softening operations being carried out in a single unit.

Other features and advantages of the invention will appear from the following specification and drawing. in which—

Figure 1 is an elevational view of the treating apparatus with the container and layers of filtering and water softening material being in section; and Fig. 2 is a vertical sectional view of the pretreatment chamber which is associated with the filter unit.

In accordance with the present invention, water may be subjected to oxidizing conditions to convert the soluble iron salts therein into insoluble suspended iron compounds. This oxidation may be carried out in accordance with the disclosure of U. S. Patent No. 2,237,882 or in any other suitable manner. The water containing the suspended material is passed into a treating zone wherein a layer of filtering material is supported upon a layer of water softening material. The water is passed through the filtering material to remove the suspended matter therefrom. A portion of the water may then be withdrawn from the container and the remainder may be passed through the layer of water softening material. All of the water is thus filtered, and the softened and the unsoftened portions are then combined to obtain water of the desired degree of softness.

In the specific embodiment of the invention described herein, a container or tank 10 provides a vertical passage or treating zone which receives a layer of filtering material 11 and a layer of water softening material 12. The lower portion of the tank 10 may contain a quantity of gravel 13 of suitable size upon which is supported the layer 12 of water softening material. The layer of filtering material is, in turn, supported on the layer of water softening material.

The container 10 is provided at the upper portion thereof with an inlet opening 14 which receives the inlet pipe 15 and with an outlet opening 16 at the lower portion of the tank. A suitable withdrawal pipe or conduit 17 is received within the outlet opening 16.

At the intermediate portion of the tank 10 adjacent the lower portion of the layer 11 of filtering material is an opening 18 which receives a draw-off pipe 19, the draw-off pipe 19 being connected to a pipe 20 which, in turn, communicates with the outlet pipe 17 outside the container. A valve 21 controls the flow of water through the pipe 20.

The pipes 17 and 19 are provided with a plurality of openings 22 and 23 respectively.

The inlet pipe 15 may be connected with suitable apparatus for oxidizing the soluble iron salts in the water. Thus the water may be received through an inlet 24 and passed through the chamber 25 which communicates through the pipe 26 with the inlet pipe 15 of the tank 10. The chamber 25 is provided with a small cylinder 27 inside the same, the walls of the cylinder being preferably equipped with a plurality of small openings therein. An air inlet tube 28 extends through the chamber 25 and into the cylinder 27 having therein an outlet opening 38 which permits the introduction of air into the cylinder 27.

Air under superatmospheric pressure may be introduced into the chamber 27 through the inlet 28 and will pass in the form of extremely small bubbles into the stream of water flowing through the chamber 25. The small bubbles of air which are thoroughly distributed through the water stream serve to oxidize the water soluble iron salts in the water and convert the same to insoluble suspended iron compounds. The construction and operation of this portion of the apparatus is described in detail in U. S. Patent No. 2,237,882 and will not be further described herein.

The top of the container 10 may be provided with a riser pipe 29 which communicates with an auxiliary chamber 30. The chamber 30, in turn, may be brought into communication with the inlet 15 by means of the pipe 31 through which the flow of water is controlled by the valve 32. An air outlet is provided at the upper portion of the chamber 30. This apparatus serves to permit the withdrawal of the air from the water without dissolving in the water a substantial portion of the air and is described in detail both as to construction and operation in U. S. Patent No. 2,237,882.

The inlet pipe 15 may be provided with a depending pipe 34 equipped with a valve 35 which is adapted to receive water from the inlet pipe 15 when the container is subjected to the usual back-washing operation. The valve 39 in the pipe 26 permits the flow of water from the chamber 25 to be interrupted at this time. The outlet 34 may be connected to a sewer or to any suitable means for disposing of the water obtained in the back-washing operation.

The water softening material in the tank 10 may consist of any suitable zeolite or base exchange composition. The filtering material which is supported on the layer of zeolite should be of a density of less than that of the zeolite in order that the back-washing of the filtering material will not cause the same to be mixed with the zeolite.

The filtering material may be of any inert substance which will not react with the water or with the zeolite and which is at the same time of a lesser density than the zeolite. For example, crushed hard coal of low density may be used for this purpose.

In carrying out the water treating operation, water is introduced into the inlet 24 and thence into the chamber 25 where it receives a great number of minute bubbles of air under superatmospheric pressure. The water carrying the air passes through the pipe 26 into the inlet pipe 15 of the container 10. From the inlet pipe 15 in the container 10, the water passes upwardly through the opening 36 into the upper portion of the container. Within the container the water flows downwardly through the filtering material which removes from the water the insoluble suspended matter therein. The layer 11 of filtering material will tend to accumulate a layer 37 of suspended material which has been removed from the water on the top thereof.

When the water in its downward flow through the container 10 reaches the lower portion of the filtering material, a portion of the water is removed from the container 10 by means of the draw-off pipe 19. The water which is not withdrawn through the draw-off pipe 19 continues its downward flow and passes through the layer 12 of zeolite wherein the water is softened by removing therefrom the calcium and magnesium salts. From the layer 12 of zeolite, the water flows downwardly through the supporting bed of gravel and is withdrawn from the container 10 through the outlet pipe 17.

The water which is removed from the container through the draw-off pipe 19 may be mixed with the water which is drawn through the outlet pipe 17 to provide a treated water of the desired degree of hardness. Since the zeolite layer tends to remove substantially all of the calcium and magnesium salts from the water which passes therethrough to provide a water of zero hardness, it is usually desirable to add to this water an unsoftened water. For most purposes, the water should contain approximately three to six grains of hardening materials per gallon of water. Since ordinary hard water contains considerably more than this amount of hardening materials, the hardness of treated water may be accurately controlled by controlling the valve 21 which regulates the quantity of hard or unsoftened water which is introduced into the final treated product. In other words, any desired amount of the water may be by-passed about the water softening layer in the container 10 to adjust the hardness of the treated water to the desired degree. Nevertheless, all of the water is free of suspended material since it has been passed through the layer 11 of filtering material.

At suitable intervals, the suspended material, collected on the layer 11 of the filtering material, may be removed by back-washing the filter bed. In this operation, water may be passed upwardly through the tank, being introduced through the outlet pipe 17. The water passes upwardly through the zeolite bed and through the bed of filtering material and is discharged from the container through the pipe 15 from whence it passes to the outlet 34. In this operation, the valve 35 should be open, while the valve 39 should be closed. The back-washing operation removes from the layer 11 of filtering material the suspended matter which has collected thereon, but does not cause the layer 11 of filtering material to be mixed with the layer 12 of zeolite since the filtering material is of a lower density than the zeolite.

When the water passes upwardly through the layer 12 of zeolite and the layer 11 of filtering material, it causes both of these layers to expand. The particles which have become packed during the filtering operation are loosened by the upflow of water and the foreign material which is collected in the beds during filtration is washed upwardly through the layers and passes out of the container through the pipe 15. Since the beds are not separated, and since, in fact, the zeolite bed supports the filter bed, the beds may readily be expanded during the back-washing operation. At the same time, the filtering material being of a lesser density than the zeolite, it does not tend to become mixed with the zeolite, but stays in a layer above the same.

With this apparatus and method for water treatment, it is entirely unnecessary to separate the layers of filtering material and water softening material and, in fact, the filtering material as shown may be supported directly on the water softening material.

Although the treatment of water has been described in connection with the removal of iron from the water, it will be obvious that the filtering and water softening operations may be applied to any water and need not be limited to water which has been subjected to oxidation to remove iron therefrom.

While in the foregoing description certain examples and specific steps have been set forth in describing the method and apparatus, it will be understood that these are illustrative only and may be modified greatly without departing from the spirit of the invention.

I claim:

1. A method of treating water comprising, oxidizing water to convert the soluble iron salts therein into insoluble iron compounds, thereafter introducing the water into the upper portion of a treating zone, said zone being provided with a layer of filtering material and a layer of water softening material, the filtering material being of a lesser density than the water softening material and being supported on the same, said filtering material being of a greater density than the water and being in the form of finely-divided particles adapted to remove substantially all suspended material from the water, passing the water downwardly through the filtering material, passing a portion of the filtered water downwardly through the water softening material, by-passing a portion of the filtered water about the water softening material, and mixing said portions of water.

2. Apparatus for treating water comprising a container providing a treating zone, a layer of filtering material and a layer of water softening material in said zone, the filtering material being of a lesser density than the water softening material and being supported thereby, and being of a greater density than the water and being in the form of finely-divided particles adapted to remove substantially all suspended material from the water, an inlet in said container above the filtering material, a draw-off pipe in said container in the lower portion of the filtering material, an outlet in said container below the water softening material, and means for connecting said draw-off pipe with said outlet.

3. Apparatus for treating water comprising a container providing a vertical passage, a layer of zeolite water softening material in the lower portion of said passage, a layer of filtering material in said passage above the zeolite, said filtering material being of lesser density than zeolite and being supported thereby and being of a greater density than the water, an inlet pipe communicating with said passage above the layer of filtering material, a draw-off pipe communicating with said passage at the lower portion of the filtering material, an outlet pipe communicating with the passage below the layer of zeolite, a pipe for bringing said draw-off pipe into communication with said outlet pipe, and a valve for controlling the flow of water through the last-mentioned pipe.

4. Apparatus for treating water comprising a container providing a treating zone, means for oxidizing the soluble iron salts in the water to convert the same to insoluble iron compounds, a layer of filtering material and a layer of water softening material in said zone, the filtering material being of a density less than that of the water softening material and being supported thereby and being of a greater density than the water, an inlet in said container above the filtering material, a draw-off pipe in said container in the lower portion of the layer of the filtering material, an outlet in said container below the water softening material, and means for bringing said draw-off pipe into communication with said outlet outside of the container.

5. Apparatus for treating water comprising a container providing a treating zone, a layer of filtering material and a layer of water softening material in said zone, the filtering material being of a lesser density than the water softening material and being supported thereby and being of a greater density than the water, an inlet in said container above the filtering material, a draw-off pipe in said container in the lower portion of the filtering material, an outlet in said container below the water softening material, means for connecting said draw-off pipe with said outlet, means for introducing water into said inlet and for withdrawing the same from said outlet, means for interrupting the flow of water through said inlet, means for introducing water into the lower portion of said container through said outlet and causing the same to pass upwardly through the water softening material and filtering material in the container to back-wash the filtering material and to remove therefrom the suspended matter collected thereon, and means for withdrawing from the upper portion of the container the back-washed water.

6. A method of treating water, comprising introducing water to be treated into the upper portion of a container, passing all of the water downwardly through a layer of filtering material, the filtering material being in the form of finely-divided particles and being adapted to remove from the water substantially all of the foreign particles therein, passing a portion of the filtered water downwardly through a layer of water-softening material disposed beneath the layer of filtering material and supporting the same, the filtering material being of a lesser density than the water-softening material and a greater density than water, by-passing a portion of the filtered water about the water-softening layer, mixing the portions of water, subsequently interrupting the flow of water into the upper portion of the container, introducing water into the lower portion of the container, passing the water upwardly from the lower portion of the container through the layer of water-softening material and the layer of filtering material to backwash the filtering material and remove therefrom the suspended matter collected thereon, and withdrawing the backwashed water from the upper portion of the container.

JOSEPH P. LAWLOR.